United States Patent [19]
Millerd, Jr. et al.

[11] Patent Number: 5,771,129
[45] Date of Patent: Jun. 23, 1998

[54] METHOD AND APPARATUS FOR DETECTING AND MATCHING THE RECORDED SPEED OF PREVIOUSLY RECORDED TAPE

[75] Inventors: Andrew B. Millerd, Jr., San Juan Capistrano, Calif.; Hiroyuki Watanabe, Hiratsuka-Kanagawa, Japan

[73] Assignee: Aiwa Co., Ltd., Tokyo, Japan

[21] Appl. No.: 644,435

[22] Filed: May 13, 1996

Related U.S. Application Data

[60] Provisional application No. 60/004,718, Oct. 2, 1995.
[51] Int. Cl.$^6$ ................................................ G11B 15/52
[52] U.S. Cl. .................................. 360/73.12; 360/73.09
[58] Field of Search .......................... 360/73.12, 73.09, 360/71

[56] References Cited

U.S. PATENT DOCUMENTS 4,700,240 10/1987 Umemoto et al. ...................... 360/48
4,885,647 12/1989 Sugiki et al. ........................ 360/73.12
5,532,835 7/1996 Nakagaki et al. ............... 360/73.08 X Primary Examiner—Aristotelis M. Psitos
Assistant Examiner—James L. Habermehl
Attorney, Agent, or Firm—Fulbright & Jaworski L.L.P.

[57] ABSTRACT

A method and apparatus for detecting and matching the recorded speed of a previously recorded tape. An algorithm changes the commanded speed to a servo system to a speed that is centered between the speed at which the sector header was written and the sector data was written. In particular, the measured synchronization portion of the sector header is initially integrated with respect to time. The measured synchronization portion of the sector data is then integrated with respect to time. An optimum speed is computed based on the difference in the speeds at which they were recorded. The commanded speed to the servo system is then changed as a result of the previous step.

24 Claims, 2 Drawing Sheets

METHOD AND APPARATUS FOR DETECTING AND MATCHING THE RECORDED SPEED OF PREVIOUSLY RECORDED TAPE

REFERENCE TO RELATED APPLICATION

This is a continuation of U.S. provisional application Ser. No. 60/004,718, filed Oct. 2, 1995.

BACKGROUND OF THE INVENTION

1. Field of the Invention

The present invention relates generally to controlling the speed of a magnetic medium, such as magnetic tape, and more particularly to a method and apparatus for detecting and matching the recorded speed of a previously recorded magnetic medium.

2. Description of the Prior Art

Digital data are conventionally stored on magnetic medium, such as magnetic tape, in the form of flux transitions on the surface of the medium. Data recovery consist of determining the presence, and relative timing, of such flux transitions. Optimal operation of a recording device therefore depends upon numerous factors, including but not limited to the proper orientation and speed of the magnetic tape and the proper orientation and position of the magnetic head. Otherwise, the information may be inaccurately retrieved even if the information was properly recorded. The integrity of the information storage system may be compromised and information may be lost.

Optimizing cartridge tape speed is especially critical for certain products, such as Quarter-Inch Cartridge (QIC) tape drives. Many QIC tape drives only allow a long term speed variation of approximately +/- 3% of the nominal tape speed measured over a minimum of 2,000,000 transition cells. Conventional QIC tape drives, however, utilize an open loop solution, which results in a long term speed variation of as much as +/- 6% of the nominal tape speed.

What is needed therefore is a method and apparatus for detecting and matching the recorded speed of a previously recorded magnetic tape.

SUMMARY OF THE INVENTION

The preceding and other shortcomings of prior art methods and systems are overcome by the present invention which provides a method and apparatus for detecting and matching the recorded speed of a previously recorded tape. An algorithm changes the commanded speed to a servo system to a speed that is centered between the speed at which the sector header was written and the sector data was written. In particular, the measured synchronization portion of the sector header is initially integrated with respect to time. The measured synchronization portion of the sector data is then integrated with respect to time. An optimum speed is computed based on the difference in the speeds at which they were recorded. The commanded speed to the servo system is then changed as a result of the previous step.

The present invention provides, in a first aspect, a program storage device readable by a machine, tangibly embodying a program of instructions executable by the machine to perform method steps for detecting and matching the recorded speed of tape having sectors including sector headers recorded at a first speed and sector data recorded at a second speed. The method steps comprise integrating a specified portion of a synchronization portion of the sector header and the sector data with respect to time to determine a speed at which the sector header and the sector data was written, determining the difference between each of the sector header and the sector data measurements with respect to time, computing a statistical average based upon the difference to determine an optimum speed, and adjusting the commanded speed based on the optimum speed.

In another aspect, the present invention provides a program storage device readable by a machine, tangibly embodying a program of instructions executable by the machine to perform method steps for detecting and matching the recorded speed of tape having sectors including sector headers recorded at a first speed and sector data recorded at a second speed. The method steps comprise integrating a specified portion of a synchronization portion of the sector header and the sector data with respect to time to determine a speed at which the sector header and the sector data was written, determining the difference between each of the sector header and the sector data measurements with respect to time, computing a statistical average based upon the difference to determine an optimum speed, and adjusting the commanded speed based on the optimum speed.

In still another aspect, the present invention provides an apparatus, comprising a computer usable medium having computer readable program code means embodied therein for causing detecting and matching the recorded speed of tape having sectors including sector headers recorded at a first speed and sector data recorded at a second speed. The computer readable program code means in the apparatus comprises computer readable program code means for causing a computer to integrate a specified portion of a synchronization portion of the sector header and the sector data with respect to time to determine a speed at which the sector header and the sector data was written, computer readable program code means for causing the computer to determine difference between each of the sector header and the sector data measurements with respect to time, computer readable program code means for causing the computer to compute a statistical average based upon the difference to determine an optimum speed, and computer readable program code means for causing the computer to adjust the commanded speed based on the optimum speed.

The foregoing and additional features and advantages of this invention will become apparent from the detailed description and accompanying drawing figures that follow. In the figures and written description, numerals indicate the various features of the invention, like numerals referring to like features throughout for both the drawing figures and the written description.

DETAILED DESCRIPTION OF THE PREFERRED EMBODIMENT(S)

Figure 1:
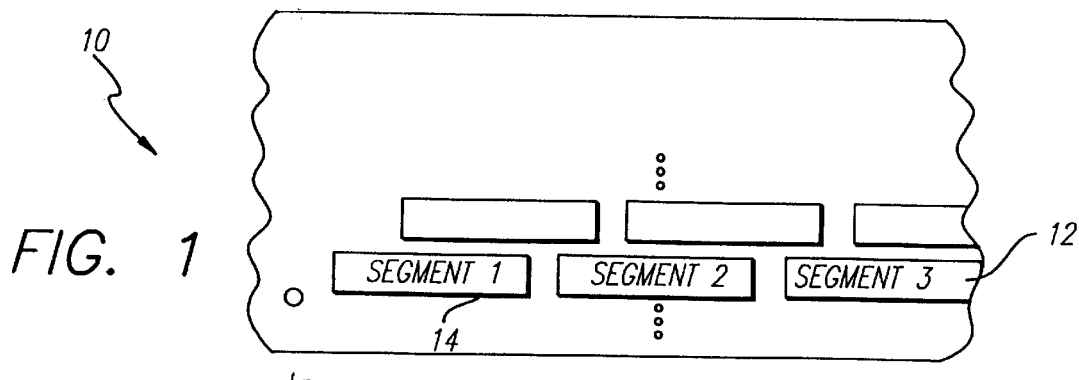
FIG. 1 is a graphical representation of a magnetic tape portion having multiple tracks divided into segments in accordance with the present invention.
Figure 2:
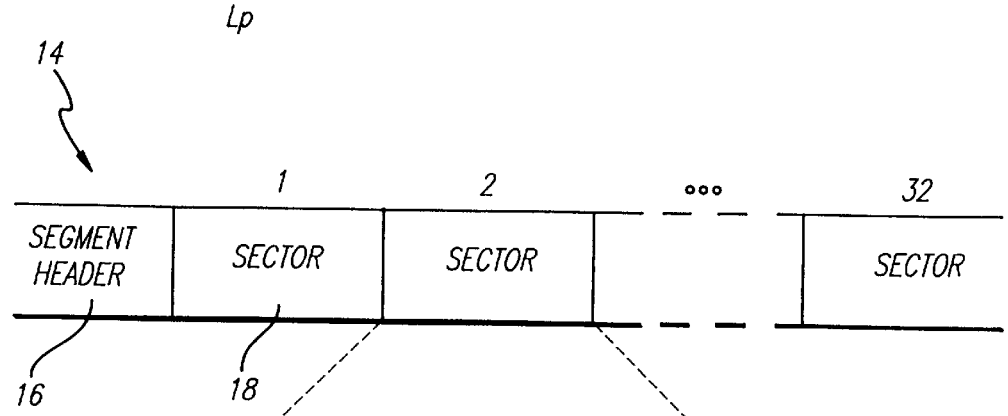
FIG. 2 is a detailed illustration of one of the segments shown in FIG. 1.

FIG. 1 is a graphical representation of a magnetic tape portion 10 having multiple tracks 12 disposed longitudinally along the length of the tape 10 portion 10. The tracks 12 are written in parallel in the forward and reverse directions. Each track 12 is divided into multiple segments 14. FIG. 2 is a diagram of a general layout of one of the segments 14 located on the magnetic tape portion 10 shown in FIG. 1. Each segment 14 includes a segment header 16 followed by a plurality of sectors 18. In the preferred embodiment, each segment 14 is divided into thirty-two sectors 18. Each sector 18 is divided into a sector header 20 and sector data 22. Each sector data 22 is followed by the sector header 20 of the next sector 18. Address information, track number and sector number are stored in the sector header 20. Data are recorded in or retrieved from the sector data 22. The sector header 20 and sector data 22 each include a synchronization field 24 and 26, preferably eight bytes (96 bits) long, although the present invention may be adapted to be used with other field lengths as well.

Figure 3:
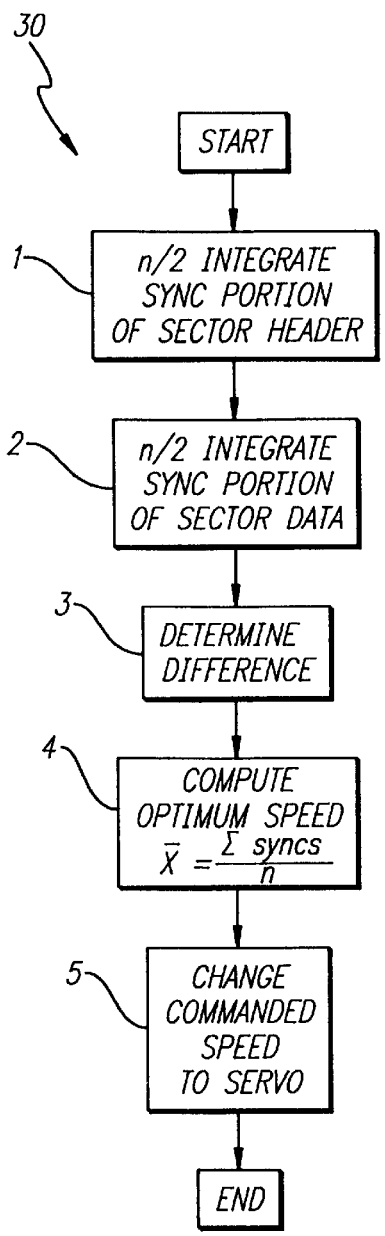
FIG. 3 and 5 are flow charts of algorithms for detecting and matching the recorded speed of a previously recorded magnetic medium.

Conventionally, the sector headers 20 and sector data 22 are written at different speeds. As a result, the sector headers 20 and sector data 22 are written often at different densities, i.e. frequencies. Consequently, the long term speed variation may be as much as +/− 6% of the nominal tape speed measured over a minimum of 2,000,000 transition cells. QIC drives typically only allow a long term tape speed variation of approximately +/−3% of the nominal tape speed. As illustrated in FIG. 3, the present invention provides an algorithm which may be implemented in a drive microprocessor for changing the commanded speed to a servo system to a speed that is centered between the speed at which the sector header 20 was written and the speed at which the sector data 22 was written. The algorithm thus centers the speed of the tape such that the read channel is at worst only approximately 3% off from the nominal value in both cases.

FIG. 3 is a flow chart of an algorithm 30 which may be implemented in a drive microprocessor for detecting and matching the recorded speed of a previously recorded magnetic medium. In step 1, the number of samples of sectors 18, n, is divided by 2 and the measured synchronization portion 24 of the sector header 20 is integrated with respect to time to determine the speed at which the sector header 20 was written. In step 2, the number of samples of sectors 18, n, is divided by 2 and the measured synchronization portion 26 of the sector data 22 is integrated with respect to time to determine the speed at which the sector data 22 was written. Thus, for example, if the number of samples, n, is equal to 1000, one-half of the samples will be sector headers 20 and the other one-half will be sector data 22. The difference between the sector header speed and the sector data speed is then computed (step 3). After the difference is computed in step 3, the optimum speed is calculated in step 4 in accordance with the equation, $$\overline{X} = E_{sync}/n \qquad (1)$$

where $E_{sync}$ is equal to the sum of the synchronization differences between the sector header speed and the sector data speed and n is equal to the number of samples i.e. sectors 18. In other words, the statistical average, which is the sum of the synchronization differences over the number of samples of sectors 18, is computed. The commanded speed to the servo system is then changed accordingly based on the results from step 5.

Thus, in accordance with the present invention, as a previously recorded tape 10 as shown in FIG. 1 is moved along, the first sector header synchronization field is measured, then the first sector data synchronization field is measured, then the second sector header synchronization field is measured followed by the second sector data synchronization field being measured, and so forth. The statistical average, which is the sum of the synchronization differences over the number of samples, is then computed to change the speed of the servo system in accordance with equation (1), shown above.

Figure 4:
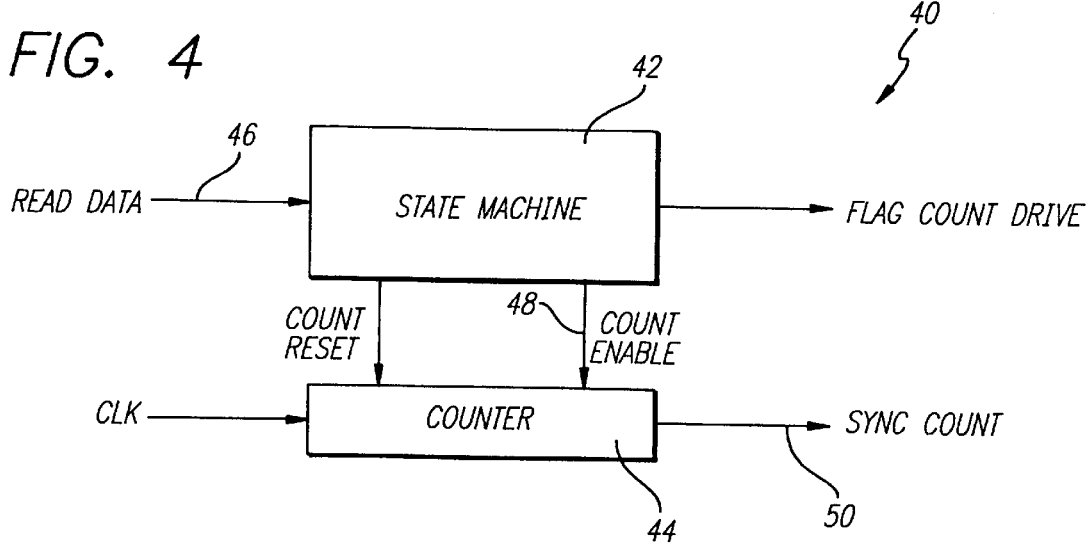
FIG. 4 is a block diagram of a circuit according to the present invention for detecting the relative speed difference between the current speed and the recorded speed by measuring a specified portion of the synchronization field.

A synchronization counting circuit 40, such as that illustrated in FIG. 4, may be used to detect the relative speed difference between the current speed and the recorded speed by measuring a specified portion of the sector header synchronization field 24 and the sector data synchronization field 26. The synchronization counting circuit 40 is clocked at a fixed rate and includes a state machine 42 and a synchronization counter 44, preferably an 8-bit counter. The clock for the circuit 40 is generated with a crystal and typically runs at sixteen times the data rate. The state machine 42 may be a commercially available or custom state machine. The counter 44 may be a conventional binary counter, such as an 8-bit binary counter manufactured by Texas Instruments.

As illustrated in FIG. 4, the read data input 46 is initially applied to the state machine 42, which includes an internal synchronization detector (not shown). The enable signal 48 for the counter 44 is provided by the synchronization detector in the state machine 42. In operation, the counter 44 is only clocked when the sector header 24 or sector data synchronization field 26 is being detected, in this case for 64-bits. After detection, the counter 44 stops clocking and the values which are left in the register maps are computed.

The synchronization counting circuit 40 thus measures a specified portion of the sector header 24 or sector data synchronization field 26. In the preferred embodiment, the synchronization counting circuit 40 measures 64 bits of the 96 bit sector header 24 or sector data 26 synchronization field. The recorded bits are measured with respect to time. The present invention is not limited to measuring 64 bits but rather may measure as many bits as desired depending upon the particular configuration on hand.

In operation, when a tape, previously recorded at tape speed "x", is placed into a different tape drive servoing at speed "x+1%", the tape actually runs at a 1% faster rate than the recorded speed. The synchronization counting circuit 40 detects the difference between the recorded tape speed and the actual tape speed, in this case 1%. The commanded speed to the servo system is then changed in response to the detected tape speed difference. In this case, the actual speed is decreased to match the recorded speed, thus matching the actual data rate on the tape.

In a typical example, the synchronization counter 44 is enabled for 8 bytes of synchronization. The 8 bytes will result in different synchronization count values depending on the actual speed of the tape. The perfect data speed is calculated in accordance with the following equation:

| Perfect Data Speed | = 8 bytes × (8 bits/byte) × (16 clocks/bit) | (2) |
|---|---|---|
| | = 1024 clocks | |

Typical synchronization count values are shown in TABLE 1 as follows:

TABLE 1

Synchronization Count Values

| Speed | No. of Clocks | Output of Counter | | |
|---|---|---|---|---|
| Nominal | 1024 | 100 | 0000 | 0000 |
| 10% Slow | 1126 | 100 | 0110 | 0110 |
| 10% Fast | 921 | 011 | 1001 | 1001 |

As shown in TABLE 1, when the output of the synchronization counter 44 is equal to 1024 clocks (binary output: 100 0000 0000), this indicates the sector header 20 or sector data 22 was written at a nominal speed. That is, optimally, 1024 clocks are required to traverse the entire 64 bit portion of either the sector header 24 or sector data synchronization field 26.

When the output of the synchronization counter 44 is greater than 1024 clocks, this indicates the sector header 20 or sector data 22 was written at a speed slower than the nominal speed. The tape is thus moving too slow anytime more than 1024 clocks are required to traverse the entire 64 bit portion of the sector header 24 or sector data 26 synchronization field. For example, as shown in TABLE 1, to traverse the 64 bit field, it may take 1126 clocks (binary output: 100 0110 0110). The difference between the nominal speed and the actual speed is 102 clocks (1126−1024=102). As shown in TABLE 1, bit 7 is a sign bit, thus limiting the dynamic range of the detector to approximately +/−12%. Consequently, every 10 clock differential translates into an approximate 1% speed differential. With the difference in this case being 102 clocks, the tape is moving approximately 10% too slow.

When the output 50 of the synchronization counter 44 is less than 1024 clocks, this indicates the sector header 20 or sector data 22 was written at a speed faster than the nominal speed. The tape is thus moving too fast anytime less than 1024 clocks are required to traverse the entire 64 bit portion of the sector header 24 or sector data synchronization field 26. For example, as shown in TABLE 1, to traverse the entire 64 bit field, it may take 921 clocks (binary output: 011 1001 1001). The difference between the nominal speed and the actual speed is 103 clocks (1024−921=103). Since every 10 clock differential translates into an approximate 1% speed differential, the tape is moving approximately 10% too fast.

In accordance with the present invention, as the tape is moved along, the synchronization counting circuit 40 first measures the first sector header synchronization field, then the first sector data synchronization field, then the second sector header synchronization field followed by the second sector data synchronization field being measured, and so forth. The statistical average, which is the sum of the synchronization differences over the number of samples, is then computed to change the speed of the servo system in accordance with equation (1), shown above.

Figure 5:
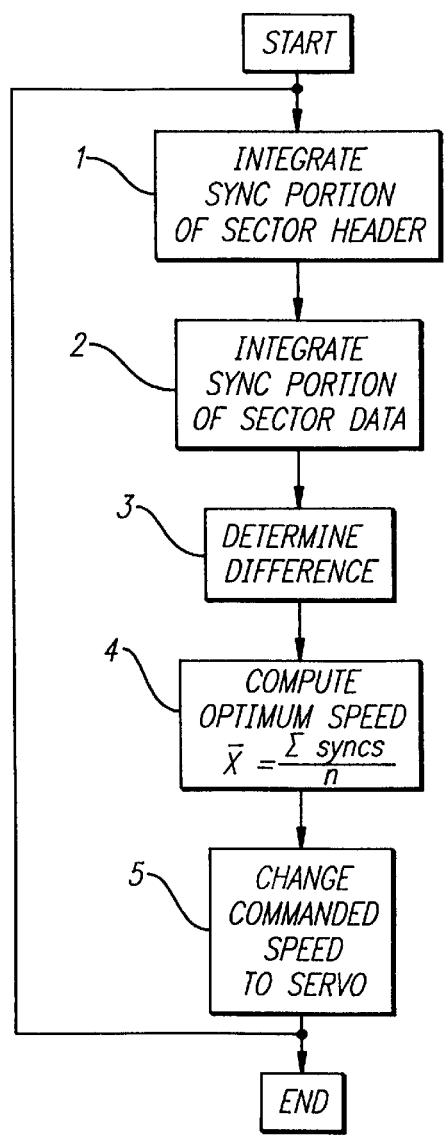

In the preferred embodiment, as shown in FIG. 3 and discussed in detail above, a portion of the beginning of the tape is measured to compute the statistical average. In an alternative embodiment, a continuous running average may be computed to continuously update the speed of the servo system, as illustrated in FIG. 5 and discussed in detail below. In particular, FIG. 5 is a flow chart of an algorithm 52 which may be implemented in a drive microprocessor for detecting and matching the recorded speed of a previously recorded magnetic medium. Referring to FIGS. 2 and 5, in step 1, the measured synchronization portion 24 of the sector header 20 is integrated with respect to time to determine the speed at which the sector header 20 was written. In step 2, the measured synchronization portion 26 of the sector data 22 is integrated with respect to time to determine the speed at which the sector data 22 was written. The difference between the sector header speed and the sector data speed is then computed (step 3). After the difference is computed in step 3, the optimum speed is calculated in step 4 in accordance with the equation, $$\overline{X} = E_{sync}/n \qquad (3)$$

where $E_{sycn}$ is equal to the sum of the synchronization differences between the sector header speed and the sector data speed and n is equal to the number of samples. In other words, the statistical average, which is the sum of the synchronization differences over the number of samples, is computed. The commanded speed to the servo system is then changed accordingly based on the results from step 5. In accordance with the present invention, the algorithm 52 loops back and continuously executes steps 1 through 5, thus generating a continuous running average which may be computed to continuously update the speed of the servo system.

It will be appreciated by persons skilled in the art that the present invention is not limited to what has been shown and described hereinabove, nor the dimensions of sizes of the physical implementation described immediately above. For example, a synchronization counting circuit which measures a different number of bits than the 64 bits of the 96 bit synchronization field discussed hereinabove may be used.

What is claimed is:

1. A program storage device readable by a machine, tangibly embodying a program of instructions executable by the machine to perform method steps for detecting and matching the recorded speed of tape having sectors including sector headers recorded at a first speed and sector data recorded at a second speed, said method steps comprising:

integrating a specified portion of a synchronization portion of said sector header and said sector data with respect to time to determine a speed at which said sector header and said sector data was written;

determining difference between each of said sector header and said sector data measurements with respect to time;

computing a statistical average based upon said difference to determine an optimum speed; and adjusting said commanded speed based on said optimum speed.

2. The method claimed in claim 1, wherein said synchronization portion of each of said sector data and said sector header is 96 bits.

3. The method claimed in claim 2, wherein said step of integrating a specified portion of a synchronization portion of said sector header and said sector data with respect to time to determine a speed at which said sector header and said sector data was written, further comprises the step of:

measuring 64 bits of said synchronization portion of said sector header; and measuring 64 bits of said synchronization portion of said sector data.

4. The method claimed in claim 1, wherein said step of adjusting said commanded speed based on said optimum speed further comprises the step of:

determining a difference between said recorded tape speed and said actual tape speed; and adjusting said commanded speed to said servo system in response to said difference.

5. The method claimed in claim 4, wherein said actual speed is increased or decreased to match said recorded speed, thus matching the actual data rate on said tape.

6. The method claimed in claim 5, further comprising the step of:

utilizing a counter clocked at a fixed rate to measure said specified portion of said sector header or sector data synchronization portion.

7. The method claimed in claim 6, wherein said counter is enabled for 8 bytes of synchronization.

8. The method claimed in claim 1, further including the step of:

continuously integrating said specified portion of said synchronization portion of said sector header and said sector data with respect to time to determine said speed at which said sector header and said sector data was written.

9. A program storage device readable by a machine, tangibly embodying a program of instructions executable by the machine to perform method steps for detecting and matching the recorded speed of tape having sectors including sector headers recorded at a first speed and sector data recorded at a second speed, said method steps comprising:

measuring a specified portion of a synchronization portion of said sector header with respect to time to determine a speed at which said sector header was written;

measuring a specified portion of a synchronization portion of said sector data with respect to time to determine a speed at which said sector data was written;

determining difference between each of said sector header and said sector data measurements with respect to time;

summing said difference with respect to time over the number of samples of sectors to determine an optimum speed; and adjusting said commanded speed based on said optimum speed.

10. The method claimed in claim 9, wherein said synchronization field for said sector data and said sector header is 96 bits.

11. The method claimed in claim 10, wherein said step of measuring a specified portion of a synchronization portion of said sector header with respect to time to determine a speed at which said sector header was written further comprises the step of:

measuring 64 bits of said synchronization portion; and said step of measuring a specified portion of a synchronization portion of said sector data with respect to time to determine a speed at which said sector data was written further comprises the step of:

measuring 64 bits of said synchronization portion.

12. The method claimed in claim 9, wherein said step of adjusting said commanded speed based on said optimum speed further comprises the step of:

determining a difference between said recorded tape speed and said actual tape speed; and adjusting said commanded speed to said servo system in response to said difference.

13. The method claimed in claim 12, wherein said actual speed is increased or decreased to match said recorded speed, thus matching the actual data rate on said tape.

14. The method claimed in claim 13, further comprising the step of:

utilizing a counter clocked at a fixed rate to measure said specified portion of said sector header or sector data synchronization portion.

15. The method claimed in claim 14, wherein said counter is enabled for 8 bytes of synchronization.

16. The method claimed in claim 9, further comprising the step of:

continuously measuring said specified portion of said synchronization portion of said sector header with respect to time to determine said speed at which said sector header was written; and continuously measuring said specified portion of said synchronization portion of said sector data with respect to time to determine said speed at which said sector data was written.

17. An apparatus, comprising:

a computer usable medium having computer readable program code means embodied therein for causing detecting and matching the recorded speed of tape having sectors including sector headers recorded at a first speed and sector data recorded at a second speed, the computer readable program code means in said apparatus comprising:

computer readable program code means for causing a computer to effect, integrate a specified portion of a synchronization portion of said sector header and said sector data with respect to time to determine a speed at which said sector header and said sector data was written;

computer readable program code means for causing the computer to determine difference between each of said sector header and said sector data measurements with respect to time;

computer readable program code means for causing the computer to compute a statistical average based upon said difference to determine an optimum speed; and computer readable program code means for causing the computer to adjust said commanded speed based on said optimum speed.

18. The apparatus claimed in claim 17, wherein said synchronization portion of each of said sector data and said sector header is 96 bits.

19. The apparatus claimed in claim 18, wherein said computer readable program code means for causing a computer to effect, integrate a specified portion of a synchronization portion of said sector header and said sector data with respect to time to determine a speed at which said sector header and said sector data was written, further comprises:

computer readable program code means for causing the computer to measure 64 bits of said synchronization portion of said sector header; and computer readable program code means for causing the computer to measure 64 bits of said synchronization portion of said sector data.

20. The apparatus claimed in claim 19, wherein said computer readable program code means for causing the computer to adjust said commanded speed based on said optimum speed further, further comprises:

computer readable program code means for causing the computer to determine a difference between said recorded tape speed and said actual tape speed; and computer readable program code means for causing the computer to adjust said commanded speed to said servo system in response to said difference.

21. The apparatus claimed in claim 20, further comprising:

computer readable program code means for causing the computer to modify said actual speed to match said recorded speed, thus matching the actual data rate on said tape.

22. The apparatus claimed in claim 21, further comprising:

computer readable program code means for causing the computer to utilize a counter clocked at a fixed rate to measure said specified portion of said sector header or sector data synchronization portion.

23. The apparatus claimed in claim 22, further comprising:

computer readable program code means for causing the computer to enable the counter for 8 bytes of synchronization.

24. The apparatus claimed in claim 17, further comprising:

computer readable program code means for causing the computer to continuously integrate said specified portion of said synchronization portion of said sector header and said sector data with respect to time to determine said speed at which said sector header and said sector data was written.

* * * * *

UNITED STATES PATENT AND TRADEMARK OFFICE
CERTIFICATE OF CORRECTION

PATENT NO. : 5,771,129
DATED : June 23, 1998
INVENTOR(S) : Andrew B. Millerd, Jr., et al.

It is certified that error appears in the above-indentified patent and that said Letters Patent is hereby corrected as shown below:

| COLUMN | LINE | |
|---|---|---|
| 2 | 7-21 | Delete entire paragraph |
| 3 | 1 | Delete the first occurrence of "10" |
| 4 | 29 | After "sector header" insert -- synchronization field -- |
| 4 | 35 | After "sector header" insert -- synchronization field -- |
| 4 | 38 | After "sector header" insert -- synchronization field -- |
| 5 | 16 | After "sector header" insert -- synchronization field -- |
| 5 | 29 | After "sector header" insert -- synchronization field -- |
| 5 | 29 | After "sector header" insert -- synchronization field -- |
| 5 | 65 | Delete "2" and insert -- 3 -- |
| 5 | 66 | After "measured" insert -- sector header --; delete "portion" and insert -- field -- |
| 6 | 2 | After "measured" insert -- sector data --; delete "portion" and insert -- field -- |
| 8 | 55 | After the first occurrence of "further", delete ",further" |

Signed and Sealed this

Twenty-ninth Day of August, 2000

Attest:

Q. TODD DICKINSON

Attesting Officer

Director of Patents and Trademarks